United States Patent [19]

Aldorasi

[11] Patent Number: 5,795,000
[45] Date of Patent: Aug. 18, 1998

[54] EXTENDABLE SHOVEL TOOL

[76] Inventor: Frederick Aldorasi, 22-25 77th St. Apt. 1-A, Jackson Hts., N.Y. 11370

[21] Appl. No.: 823,336

[22] Filed: Mar. 24, 1997

[51] Int. Cl.⁶ ........................................... A01B 1/22
[52] U.S. Cl. .......................................... 294/57
[58] Field of Search .................. 294/19.1, 49, 54.5, 294/57, 58; 16/115; 15/144.4; 403/109, 377, 378

[56] References Cited

U.S. PATENT DOCUMENTS

| D. 267,468 | 1/1983 | Simms | 294/54.5 X |
| 2,047,485 | 7/1936 | McBrady | 294/57 |
| 2,085,382 | 6/1937 | Nebor | 294/57 X |
| 3,226,149 | 12/1965 | McJohnson | 294/57 X |
| 5,048,883 | 9/1991 | Waluk | 294/57 X |
| 5,577,786 | 11/1996 | Laine | 294/57 X |

FOREIGN PATENT DOCUMENTS

| 667608 | 11/1938 | Germany | 294/57 |
| 14920 | 2/1906 | Norway | 294/57 |
| 87623 | 10/1936 | Sweden | 294/57 |
| 122160 | 1/1919 | United Kingdom | 294/57 |

*Primary Examiner*—Johnny D. Cherry

[57] ABSTRACT

An extendable shovel tool including a shovel blade member. The shovel blade member has a rear end with a handle member projecting therefrom. The handle member has an opening and at least three holes proportionately spaced along the length. A tubular member is sized for positioning within the handle member and is capable of increasing and decreasing the operable length of the handle member. Lastly, a button, that is retractable, is mounted within the tubular member for locking the tubular member within the handle member.

1 Claim, 2 Drawing Sheets

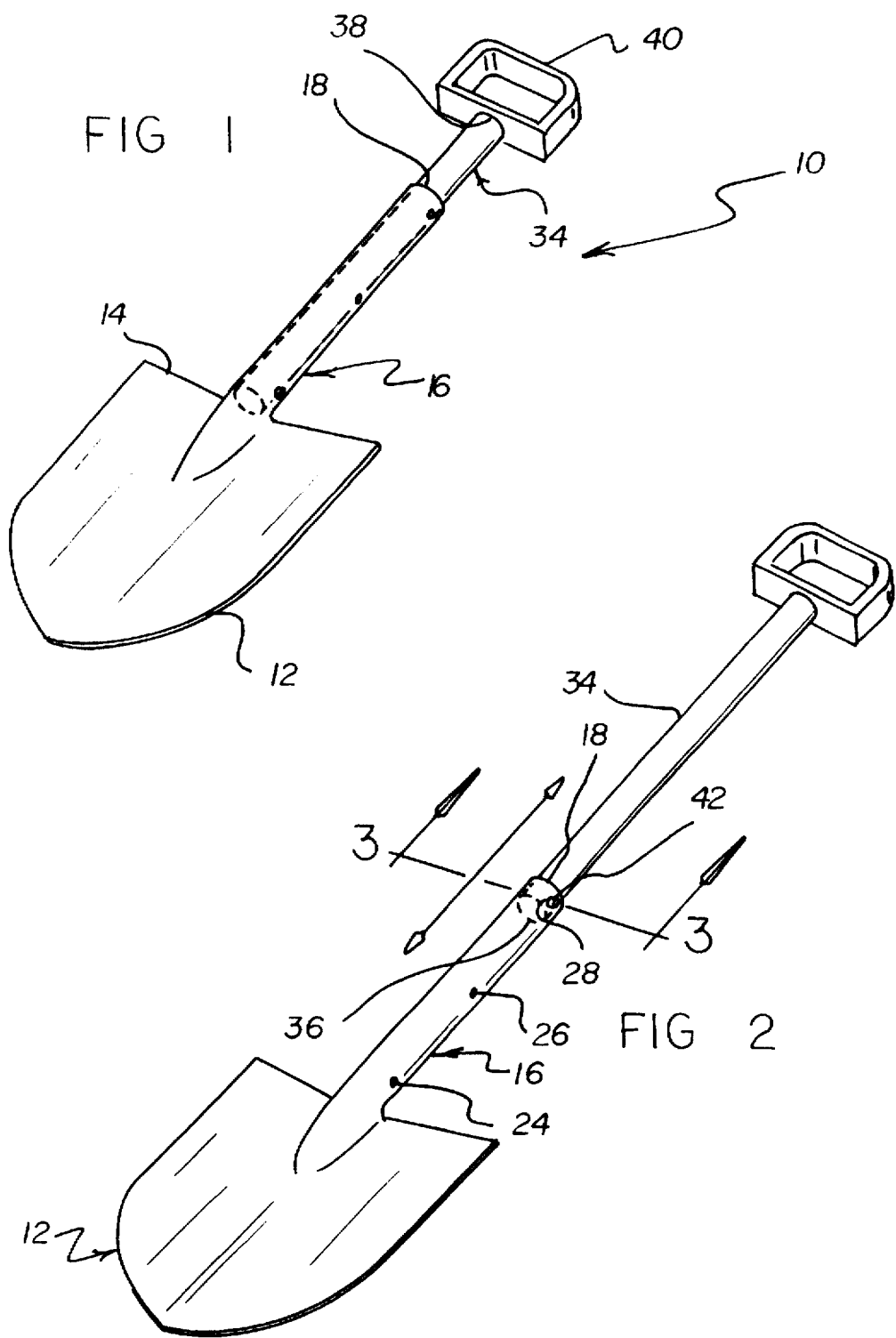

EXTENDABLE SHOVEL TOOL

BACKGROUND OF THE INVENTION

1. Field of the Invention

The present invention relates to an extendable shovel tool and more particularly pertains to providing a shovel with an extendable handle that will protract and retract as needed and further including a button for locking the handle.

2. Description of the Prior Art

The use of an adjustable handled shovel is known in the prior art. More specifically, adjustable handled shovels heretofore devised and utilized for the purpose of lifting a load are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,447,349 to Coble discloses an auxiliary handle for shovels. U.S. Pat. No. 4,787,661 to Rutledge discloses an adjustable double handled shovel. U.S. Pat. Des. 267,468 to Simms discloses an extendible snow shovel. U.S. Pat. No. 4,692,954 to Shaud discloses a snow shovel. U.S. Pat. No. 4,484,635 to Sidlo discloses a garden row making tool. Lastly, U.S. Pat. No. 4,240,656 to Eiffinger discloses an apparatus for retrieval and disposal of animal excrements.

In this respect, the extendable shovel tool according to the present invention substantially departs from the conventional concepts and designs of the prior art, and in so doing provides an apparatus primarily developed for the purpose of providing a shovel with an extendable handle that will protract and retract as needed and further including a button for locking the handle.

Therefore, it can be appreciated that there exists a continuing need for a new and improved extendable shovel tool which can be used for providing a shovel with an extendable handle that will protract and retract as needed and further including a button for locking the handle. In this regard, the present invention substantially fulfills this need.

SUMMARY OF THE INVENTION

In view of the foregoing disadvantages inherent in the known types of adjustable handled shovels now present in the prior art, the present invention provides an improved extendable shovel tool. As such, the general purpose of the present invention, which will be described subsequently in greater detail, is to provide a new and improved extendable shovel tool which has all the advantages of the prior art and none of the disadvantages.

To attain this, the present invention essentially comprises a generally rectangular shovel blade member. The shovel blade member is slightly convex. The shovel blade has a rear end with a cylindrical handle member projecting therefrom. The handle member has a length of about 38½ inches. The cylindrical handle member has an opening leading into an interior portion thereof. The cylindrical handle member has at least three holes proportionately spaced along the length thereof. An elongated tubular member is provided. The tubular member has an interior end and an exterior end. The exterior end of the tubular member has a D-handle fixedly attached. The tubular member is sized for positioning within the cylindrical handle member. The tubular member is capable of increasing and decreasing the operable length of the cylindrical handle member by sliding lengthwise within the cylindrical handle member. Lastly, a button with a bias means is mounted within the tubular member. The bias means will place the button in protracted and retracted positions with respect to the tubular member. The button is spaced from the interior end of the tubular member. The button is retracted when the tubular member is positioned within the cylindrical handle member. The button is protracted when the button engages one of the holes of the cylindrical handle member, and when the tubular member is positioned therein. The button is capable of locking the tubular member within the cylindrical handle member when protracted through one of the holes.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved extendable shovel tool which has all the advantages of the prior art adjustable handled shovels and none of the disadvantages.

It is another object of the present invention to provide a new and improved extendable shovel tool which may be easily and efficiently manufactured and marketed.

It is a further object of the present invention to provide a new and improved extendable shovel tool which is of a durable and reliable construction.

An even further object of the present invention is to provide a new and improved extendable shovel tool which is susceptible of a low cost of manufacture with regard to both materials and labor, and which accordingly is then susceptible of low prices of sale to the consuming public, thereby making such extendable shovel tool economically available to the buying public.

Still yet another object of the present invention is to provide a new and improved extendable shovel tool which provides in the apparatuses and methods of the prior art some of the advantages thereof, while simultaneously overcoming some of the disadvantages normally associated therewith.

Still another object of the present invention is to providing a shovel with an extendable handle that will protract and retract as needed and further including a button for locking the handle.

Lastly, it is an object of the present invention to provide a new and improved shovel blade member. The shovel blade

3 member has a rear end with a handle member projecting therefrom. The handle member has an opening and at least three holes proportionately spaced along the length. A tubular member is sized for positioning within the handle member and is capable of increasing and decreasing the operable length of the handle member. Lastly, a button with a bias means is mounted within the tubular member for locking the tubular member within the handle member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the extendable shovel tool constructed in accordance with the principles of the present invention.

FIG. 2 is an isometric view of the present invention in an extended orientation.

Similar reference characters refer to similar parts throughout the several views of the drawings.

DESCRIPTION OF THE PREFERRED EMBODIMENT

Figure 3:
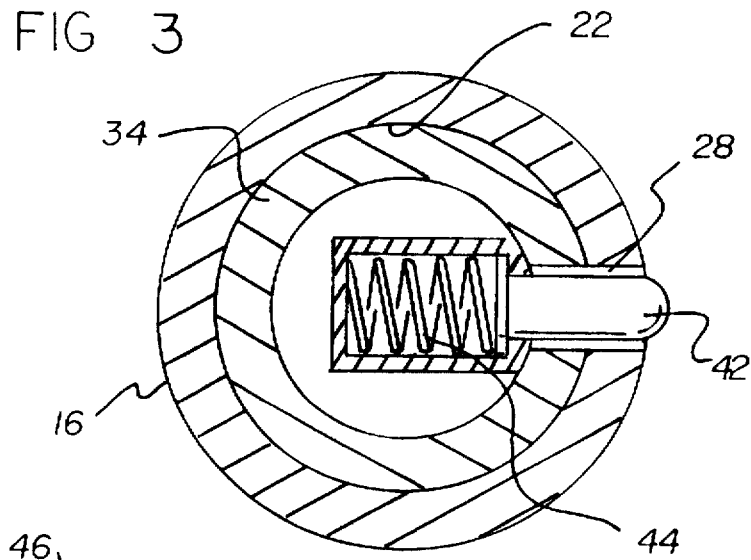
FIG. 3 is a cross-sectional view of the present invention taken along line 3—3 of FIG. 2.

With reference now to the drawings, and in particular to FIG. 1 thereof, a new and improved extendable shovel tool embodying the principles and concepts of the present invention and generally designated by the reference numeral 10 will be described.

The present invention, the new and improved extendable shovel tool, is comprised of a plurality of components. Such components in their broadest context include a shovel blade, a handle and a tubular member. Such components are individually configured and correlated with respect to each other so as to attain the desired objective.

More specifically, it will be noted that a generally rectangular shovel blade member 12 is included. The shovel blade member is slightly convex, as seen in FIGS. 1 and 2. The shovel blade has rear end 14 with a cylindrical handle member 16 that projects outwardly from the rear end. The shovel and handle, as seen in FIGS. 1 and 2, are of uniform construction and made of a rigid material. The handle member has a length of about 38½ inches. The cylindrical handle member has an opening 18 that leads into an interior portion 22. The cylindrical handle member has at least three holes 24, 26, and 28. The holes are proportionately spaced along the length of the cylindrical handle member. The first hole 24 is spaced from the rear end of the shovel blade. The third hole 28 is spaced from the opening of the cylindrical

4 handle member. The second hole 26 is symmetrically spaced from the first and third holes, as shown in FIG. 2.

Included is an elongated tubular member 34. The tubular member has an interior end 36 and an exterior end 38. The exterior end, as seen in FIG. 1, of the tubular member has a D-handle 40 that is fixedly attached. The tubular member is sized for positioning within the cylindrical handle member 16. The tubular member will increase and decrease the operable length of the cylindrical handle member. The length is adjusted by sliding the tubular member lengthwise within the cylindrical handle member. FIG. 1 shows the tubular member allowing the operable length to be decreased for use of the shovel in compact places. FIG. 2 shows the tubular member increasing the operable length of the handle for use in areas where the shortened handled is not needed.

Also, a button 42 with a bias means 44 is provided. As shown in FIG. 3, the button and bias means are mounted within the tubular member. The bias means will place the button in protracted and retracted positions with respect to the tubular member. The button is spaced from the interior end 36 of the tubular member. The button is retracted when the tubular member is positioned within the cylindrical handle member 16. The button is then protracted, when the button engages one of the holes of the cylindrical handle member, and when the tubular member is positioned therein. The button, within the third hole of the handle member, is capable of locking the tubular member within the cylindrical handle member when protracted through the one of the holes.

Figure 4:
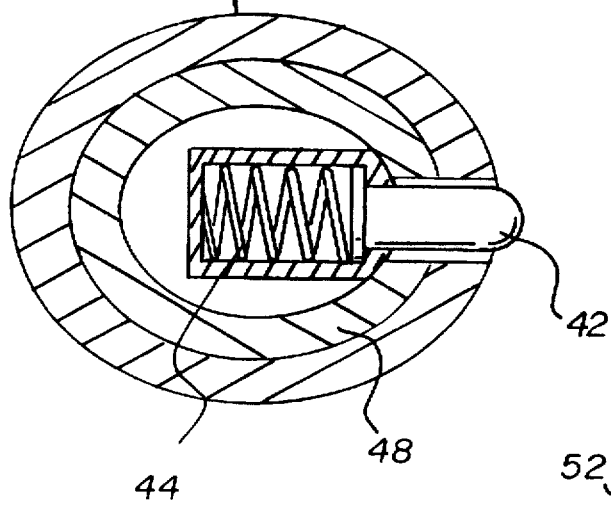
FIG. 4 is a cross-sectional view of an oval embodiment of the present invention.
Figure 5:
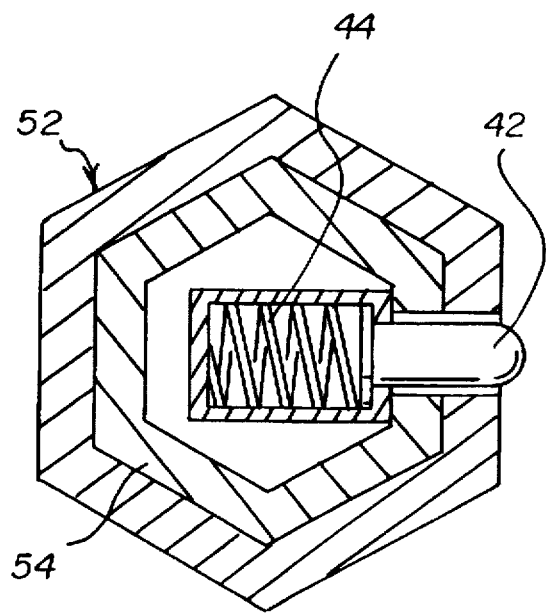
FIG. 5 is a cross-sectional view of an hexagonal embodiment of the present invention.

Lastly, it is illustrated in FIGS. 4 and 5 that the handle member and the tubular member are not restricted to a cylindrical shape. In FIG. 4, the handle member has a length of about 38½ inches and an oval cross-section 46. The tubular member 48 is also oval for positioning within the oval handle. In FIG. 5, the handle member has a length of about 38½ inches and a hexagonal cross-section 52. In this case the tubular member 54 is hexagonal for positioning within the hexagonal handle.

The present invention is a shovel that has a short handle shovel measuring about 38½ inches. With the addition of a tubular member, the handle is extendable to 62 inches. The handle member is hollowed out so as to receive the tubular member. Once the tubular member, is in the handle member it is can be pulled up within the handle member. The tubular member is locked within the handle by a button with a bias means. The present invention extendable handle allows the shovel to serve two purposes. When the tubular member is pushed down within the handle member, the handle is shortened for use in compact places. When the tubular member is fully extended from within the handle member, it is used with any other job and can be a back saver. The extendable shovel tool is easily stored in the trunk of a vehicle for later use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An extendable shovel tool for use in compact spaces comprising in combination:

a generally rectangular shovel blade member being slightly convex, the shovel blade member having a rear end with a cylindrical handle member projecting therefrom, the shovel and handle are of uniform construction, the handle member having a length of about 38½ inches, the cylindrical handle member having an opening leading into an interior portion thereof, the cylindrical handle member having at least three holes proportionately spaced along the length thereof, the three holes form a first hole, a second hole and a third hole, the first hole being spaced from the rear end, the third hole being spaced from the opening of the cylindrical handle member, the second hole being symmetrically spaced from the first and second hole;

an elongated tubular member with an interior end and an exterior end, the exterior end of the tubular member having a D-handle fixedly attached thereto, the tubular member being sized for positioning within the cylindrical handle member, the tubular member being capable of increasing and decreasing the operable length of the cylindrical handle member by sliding lengthwise within the cylindrical handle member; and a button with a bias means being mounted within the tubular member for placing the button in protracted and retracted positions with respect to the tubular member, the button being spaced from the interior end of the tubular member, the button being retracted when the tubular member is positioned within the cylindrical handle member, the button being protracted when the button engages one of the holes of the cylindrical handle member when the tubular member is positioned therein, the button being capable of locking the tubular member within the cylindrical handle member when protracted through one of the holes.

* * * * *